United States Patent [19]
Dourian et al.

[11] 3,826,046
[45] July 30, 1974

[54] POWER TOOL ATTACHMENT

[75] Inventors: Vincent J. Dourian, Algonquin; William M. Bassett, Highland Park, both of Ill.

[73] Assignee: New Concepts Co., Inc., Algonquin, Ill.

[22] Filed: Dec. 8, 1972

[21] Appl. No.: 313,329

[52] U.S. Cl............................ 51/170 TL, 144/35 A
[51] Int. Cl............................................. B24b 23/00
[58] Field of Search............ 51/170 TL; 74/110, 50, 74/51; 408/20; 144/35 A; 192/20

[56] References Cited
UNITED STATES PATENTS

| | | | |
|---|---|---|---|
| 3,007,230 | 11/1961 | Riedl | 51/170 TL |
| 3,226,885 | 1/1966 | Cutrone | 51/170 TL |
| 3,392,811 | 7/1968 | Heisler | 192/20 |

OTHER PUBLICATIONS

Strasser, F.; 10 Ways to Change Straight-Line Direction. In Product Engineering. 31 (9): pp. 61–63. Feb. 29, 1960. TJ1.P93.

*Primary Examiner*—Al Lawrence Smith
*Assistant Examiner*—Robert C. Watson
*Attorney, Agent, or Firm*—Anthony S. Zummer

[57] ABSTRACT

A power tool attachment which is particularly adapted to be mounted on a saber saw to provide a positive reciprocating motion in a direction other than the direction of motion of the saber saw output. The attachment includes a housing which is adapted for releasably mounting on a saber saw. A linkage is mounted in the housing and is adapted for connection to the output of the saber saw. A clutch is drivingly connected to the input linkage. An arm drive is drivingly connected to the clutch to be driven thereby. An output arm is connected to the arm drive to be reciprocated in a direction other than the direction of reciprocation of the saber saw output.

11 Claims, 7 Drawing Figures

PATENTED JUL 30 1974 3,826,046

POWER TOOL ATTACHMENT

BACKGROUND OF THE INVENTION

Although a saber saw is quite useful for cutting, the saber saw has a high-speed reciprocating output which could be utilized for a myriad of other jobs, such as, scraping, filing, sanding, polishing, buffing and chiseling. The conventional construction of a saber saw is such that it may not be used conveniently for many of these jobs. There are known attachments for a saber saw which convert the direct motion of the saber saw to the output of a tool. A typical example of such an attachment is shown in U.S. Pat. No. 3,226,885 to Cutrone. The attachment serves a useful function as a sander. However, the attachment has a very limited purpose, that is, sanding; and the reciprocation is not a positive reciprocation in both directions.

SUMMARY OF THE INVENTION

The present invention relates to an improved construction for a power tool attachment which is particularly adapted for mounting on a saber saw. The instant power tool attachment includes a housing, which has means connected to the housing for releasably connecting the housing to a saber saw. An input linkage is mounted in the housing. One end of the input linkage is adapted for releasable connection to the reciprocating output of the saber saw. The input linkage is drivingly connected to a clutch mounted within the housing. The clutch is particularly adapted to have slippage in the event that an overload is applied to the output of the attachment. The clutch is drivingly connected to an arm drive which is positioned within the housing. The arm drive has its input connected to the clutch; and its output is connected to an output arm which is reciprocally mounted on the housing. The output arm has a chuck connected to its outwardly extending free end for connecting a working tool to the arm.

It is one of the principal objects of the present invention to provide a power tool attachment which may be readily connected to a power tool to provide a positive reciprocating output, which reciprocating output moves in a direction other than the direction of movement of the output of the power tool.

It is another object of the instant invention to provide a power tool attachment which has a reciprocating output, which reciprocating output may be stopped in the event that there is an overload on the output without stopping the operation of the power tool.

Other objects and uses of the present invention will become readily apparent to those skilled in the art upon a perusal of the following specification in light of the accompanying drawings.

BRIEF DESCRIPTION OF THE DRAWINGS

FIG. 7 is a cross-sectional bottom view taken on Line 7—7 of FIG. 6.

DESCRIPTION OF THE PREFERRED EMBODIMENT

Figure 1:
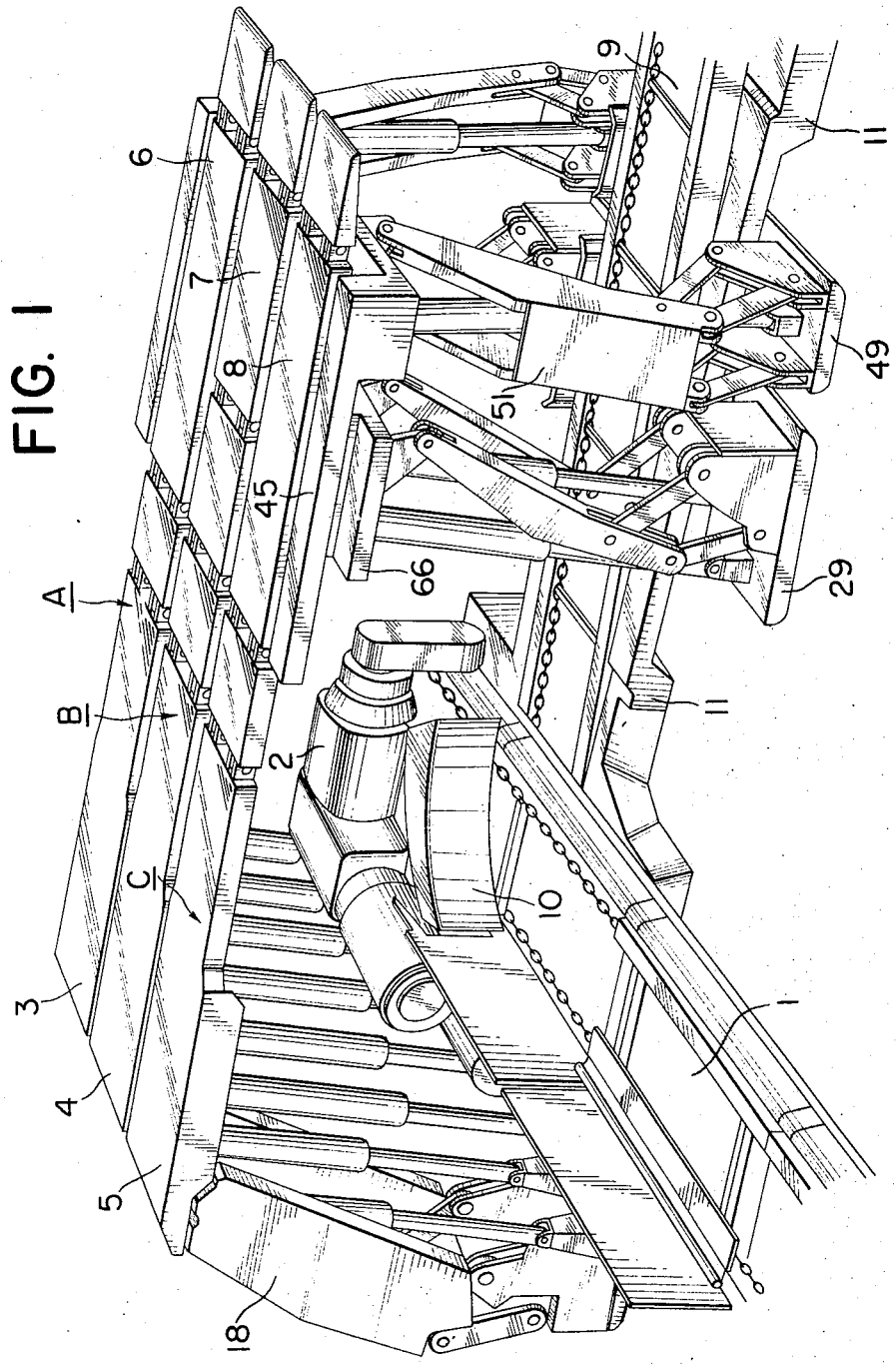
FIG. 1 is a perspective view showing a power tool attachment embodying the present invention releasably connected to a saber saw power tool.
Figure 2:
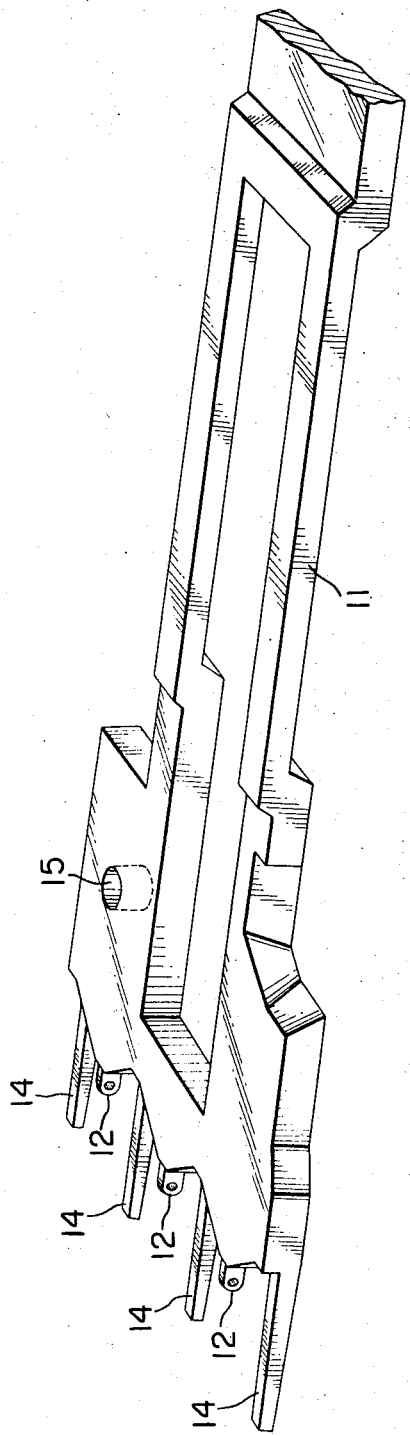
FIG. 2 is an enlarged side elevation of a portion of the power tool attachment and saber saw shown in FIG. 1, with portions broken away in order to show better the construction of an input linkage which is part of the power tool attachment.
Figure 6:
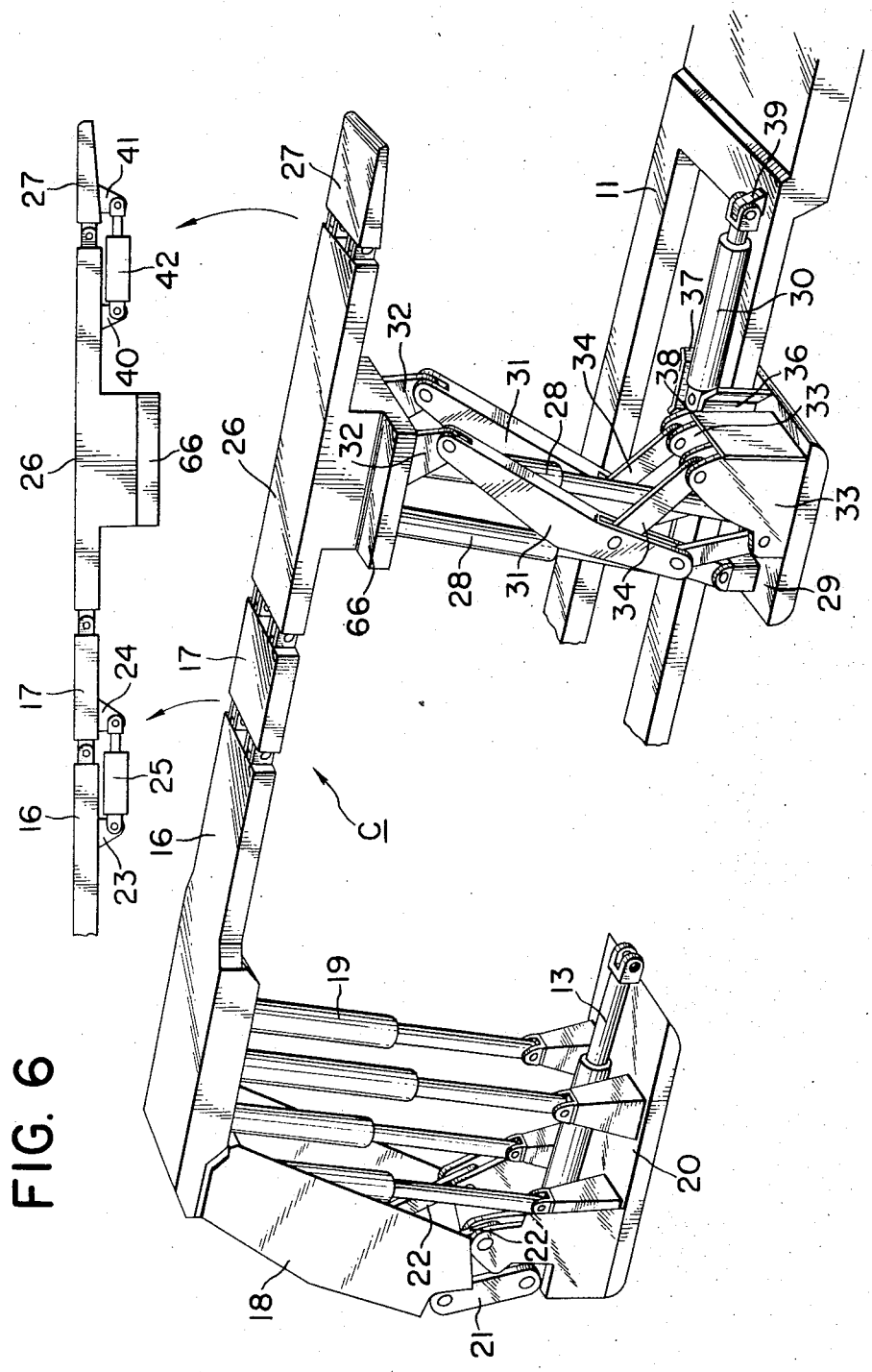
FIG. 6 is a cross-sectional side elevational view taken on line 6—6 of FIG. 5.

Referring now to the drawings, and especially to FIG. 1, a power tool 10, that is, a saber saw, is shown therein, with a power tool attachment 12 embodying the instant invention mounted on the saber saw. As may be seen in FIG. 6, the power tool attachment 12 generally includes a housing 14 and an input linkage 16 mounted in the housing and being adapted for connection to the saber saw. The input linkage is connected to a pair of identical one-way clutches 18 and 20, which clutches are drivingly connected to an arm drive 22. The arm drive 22 is drivingly connected to an output arm 24, which is reciprocally mounted in the housing 14. As is shown in FIG. 1, the output arm 24 has mounted at its working or free end a chuck 26. A plurality of clips 28 mounted on the housing 14 is in releasable engagement with the saber saw 10 to provide a means for releasably attaching the power tool attachment to the saber saw.

The saber saw 10 is conventional in its construction; and generally includes a casing 30, which houses a conventional electric motor, which is not shown herein. Formed integral with the casing is a handle 32 for holding the saber saw. The saber saw also includes a base plate 34, which is connected to the casing and provides a flat support for the saber saw. The saber saw has a reciprocating output in the form of a tongue 36, which is drivingly connected to the motor through a well-known and appropriate mechanism. The clips 28 releasably secure the power tool attachment 12 to the base plate 34 of the saber saw.

The housing 14 includes a generally flat rectangular floor 38, which has formed integral with its longer edges a pair of identical side walls 40 and 42. Each of the side walls 40 and 42 contains a shaft bearing aperture 44 to support a portion of the arm drive, as will be described in detail hereinafter. A front wall 46 is formed integral with one of the shorter edges of the floor 38 and the side walls 40 and 42. The front wall 46 includes an output arm bearing aperture 48 to receive a bearing for the output arm 24. A rear wall 50 is also formed integral with the other of the shorter edges of the floor 38 and the side walls 40 and 42. The rear wall has an output arm bearing aperture 52 contained therein, which aperture is aligned with bearing aperture 48. The housing 14 has a top 54 mounted on the upper edges of the front and rear walls and the side walls. The top is flat and contains a linkage aperture 56, which receives a portion of the input linkage 16. The top also includes an axial bearing aperture 58, which receives a portion of the arm drive 22.

The input linkage 16 is drivingly connected to the tongue 36 of the saber saw, which is the reciprocating output of the saber saw. The linkage 16 includes a connector link 60, which has a chuck end 62 pivotedly connected to the tongue 36. The connector link 60 has an enlarged pivot head 64 on the other end thereof.

The pivot link is pivotedly mounted on a shaft bearing 66. The bearing is, in turn, mounted on a connector shaft 68. A pair of throw arms 70 and 72 are mounted on opposite ends of the connector shaft 68. The throw arms 70 and 72 are drivingly connected to the clutches 18 and 20, respectively.

The throw arm 80 is formed integral with a disc face 74, which is a part of the clutch 18, while the throw arm 72 is formed integral with a disc face 76, which is part of the clutch 20. A composition clutch face material 78 is positioned in frictional engagement with the face 74; and a like composition clutch face material 80 is placed in frictional engagement with face 76. A clutch disc 82 is fixed to the composition material 78; and a clutch disc 84 is fixed to the composition material 80.

The arm drive 22 includes a pinion shaft 86, which has its opposite ends rotatably mounted in pinion shaft bearings 88 and 90. The bearings 88 and 90 are mounted in bearing shaft apertures 44 of side walls 40 and 42, respectively. The pinion shaft 86 rotatably receives the disc faces 74 and 76, while the clutch discs 82 and 84 are fixed to the shaft to provide a driving connection therewith. A helical pinion 92 is fixed to the pinion shaft 86 to be driven thereby. The helical pinion drives a driven member 94, which has on its face a portion of a helical gear 96 meshing with the pinion 92. The driven member 94 is mounted on an axle 98, which is mounted in an axle bearing 100. The axle bearing 100 is mounted in the axle bearing aperture 58 of the top 54. A connector rod 102 has one end drivingly connected to the drive member 94, and the other end pivotedly connected to the output arm 24 through a pivot screw 104.

The output arm includes a rear arm bearing 106, which is mounted in the aperture 52 in the rear wall. A front bearing 108 is mounted in the aperture 48 in the front wall. The bearing 108 has a slotted portion 110 to receive a portion of the connector arm 102.

Figure 3:
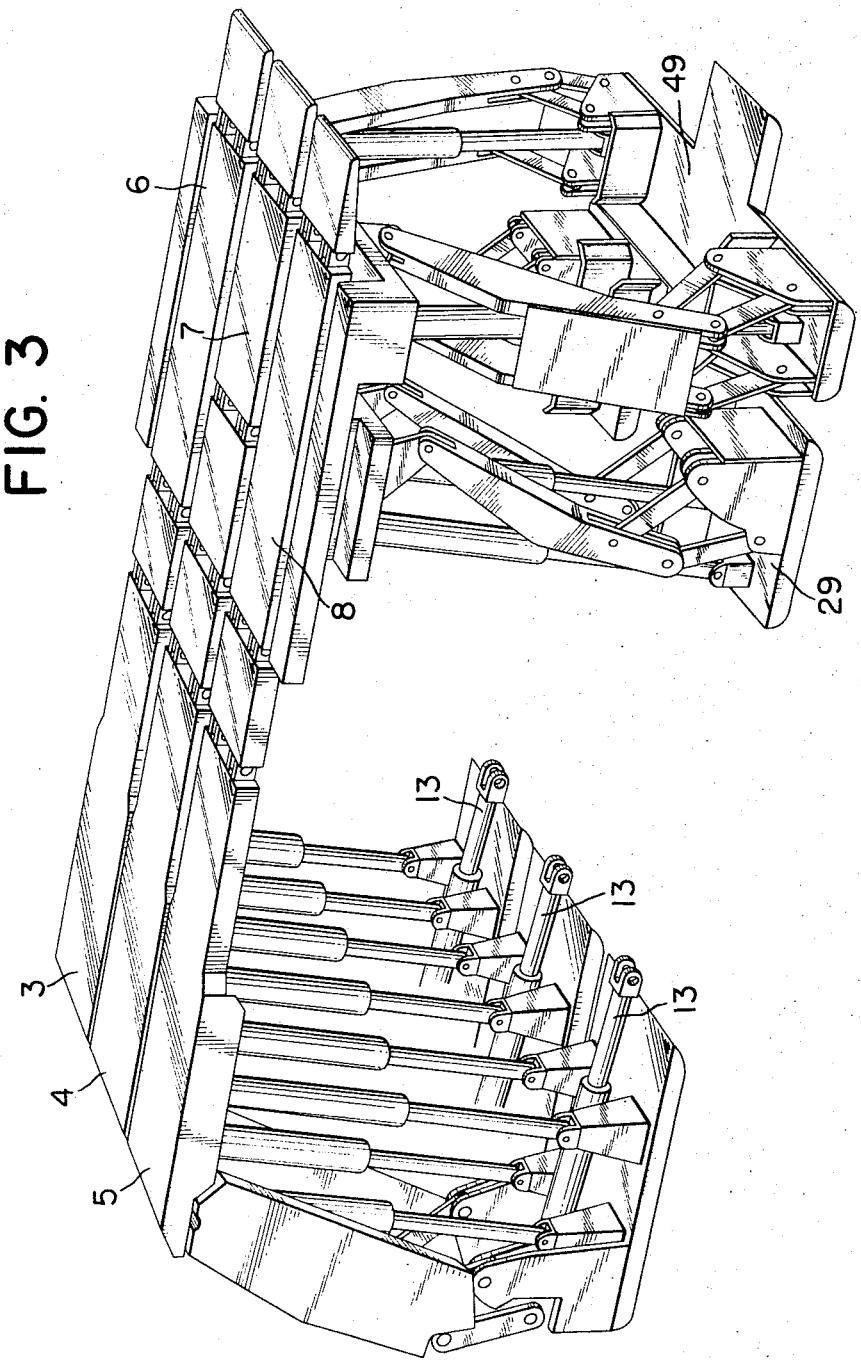
FIG. 3 is an end view of a portion of a chuck mounted on an output arm positioned in one attitude.
Figure 4:
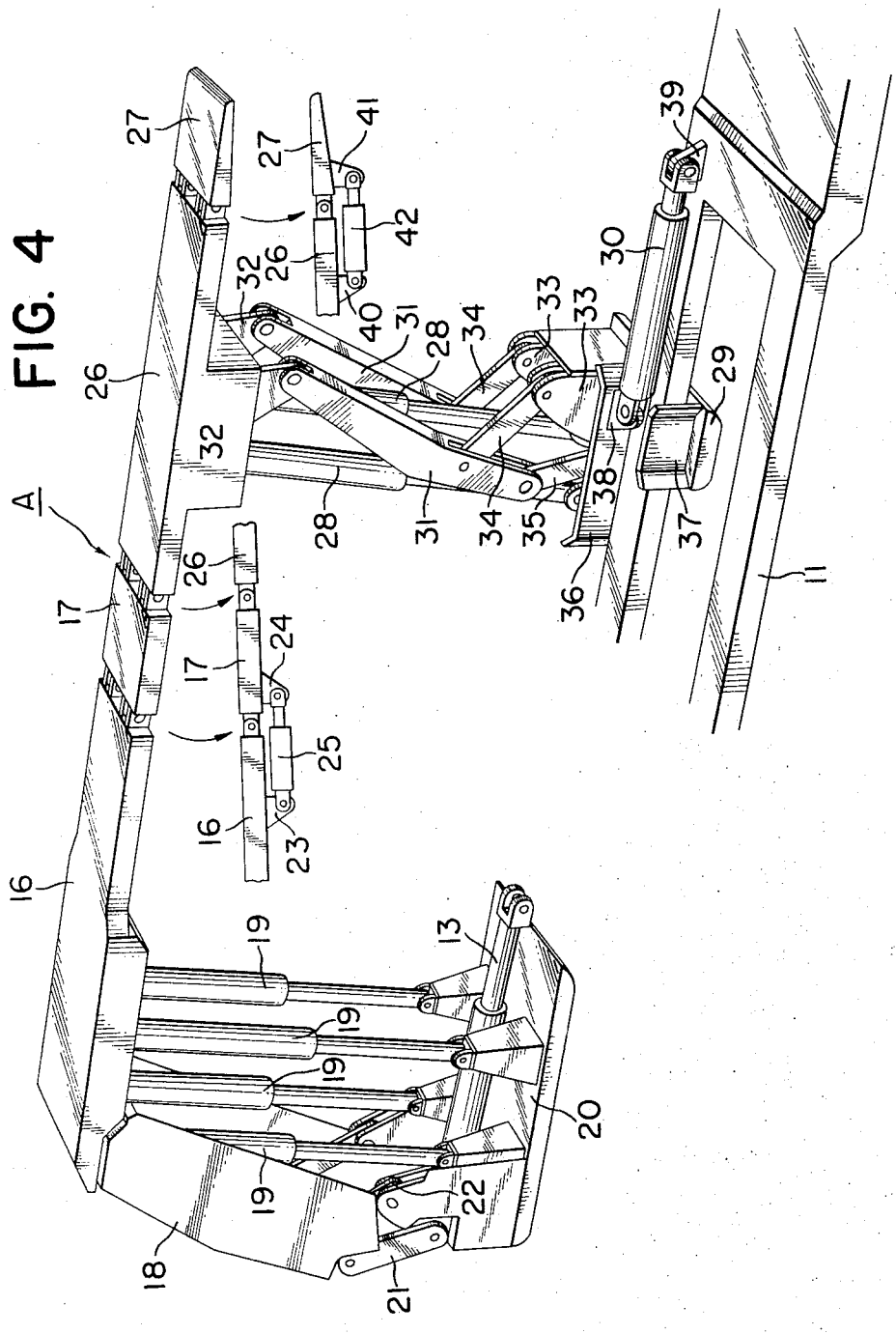
FIG. 4 is an end view similar to FIG. 3, but showing the chuck rotated 90°.
Figure 5:
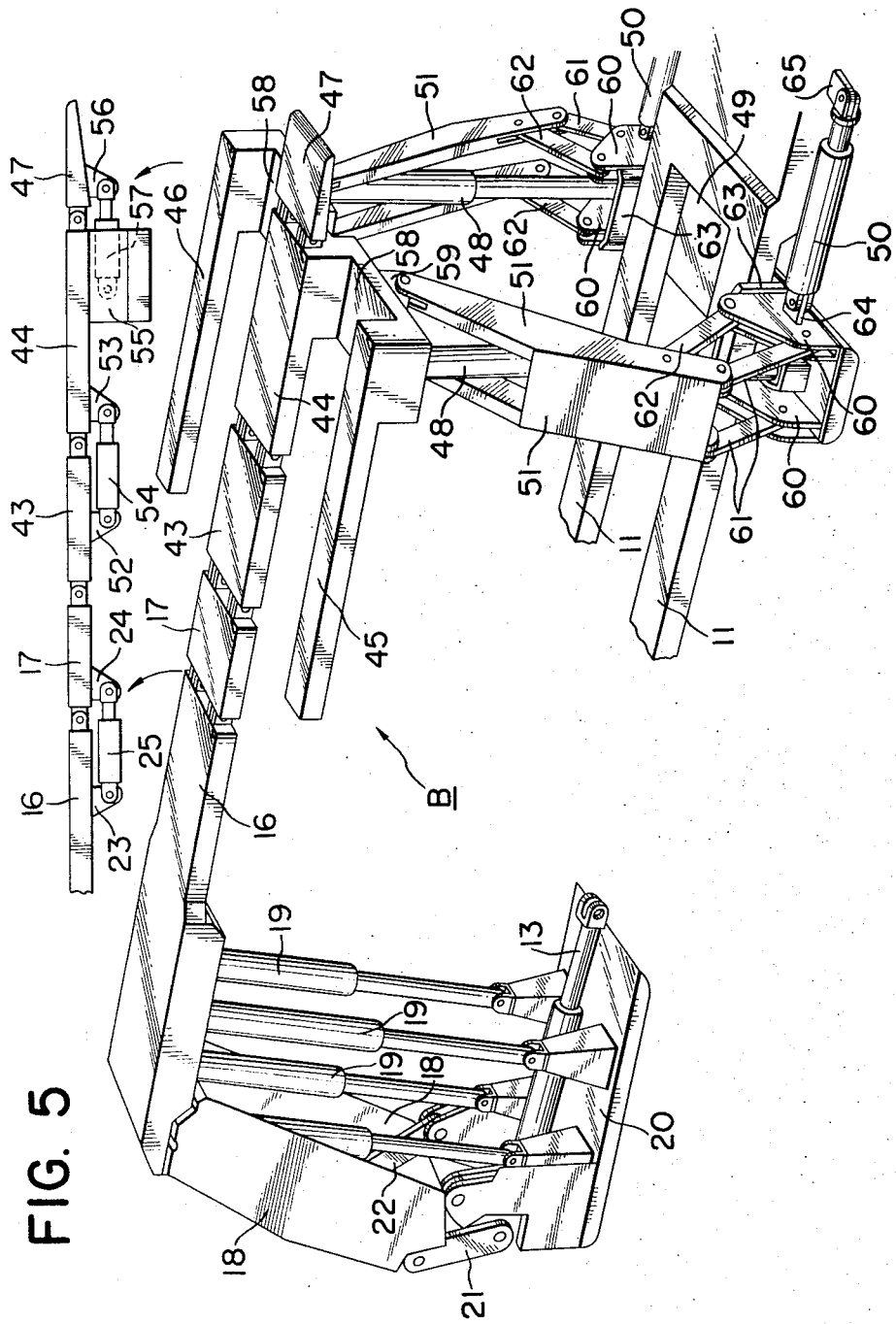
FIG. 5 is a cross-sectional end view taken on Line 5—5 of FIG. 2.

As was mentioned above, the chuck 26 is mounted on the free end of the output arm. The chuck includes a body 112, with a central aperture 114. A set screw 116 mounted in the body 112 provides a means for holding a tool. The chuck may be rotated from the attitude shown in FIG. 3 to that shown in FIG. 4 for any selected application. It may be appreciated that any suitable tool may be mounted in the chuck 26. For instance, a rasp, a file, a scraper or any other suitable tool may be positioned in the chuck to provide a working tool for a given job.

Once a tool is positioned in the chuck 26, the saber saw 10 is turned on, so that the reciprocating output, that is, tongue 36, is placed into motion, reciprocating in a vertical direction, as viewed in the drawings. The reciprocation of the tongue 36 then drives the input linkage 16. The connector link 60 is reciprocated upward and downward; and the throw arms 70 and 72 are pivoted around the pinion shaft 86. The pivoting of the throw arms drives the clutches 18 and 20 to rotate the pinion shaft 86. As the pinion shaft 86 rotates, the helical pinion gear then rotates the driven member 94 about its axle. The rotational motion of the driven member then moves the connector rod 102 back and forth to reciprocate the output arm 24. It may be appreciated that the attachment, with the saber saw, may be placed on a flat surface, with the floor 38 being the resting place for the attachment and the saber saw. The reciprocation of the output arm is at 90° to the direction of reciprocation of the tongue 36, so that the device may be used for scraping, sanding, rasping or any other suitable job. It is important to note that there is a positive drive in both directions of movement, that is, there is a positive drive when the output arm extends outward from the housing and when it is returned. Furthermore, the arm is positively located relative to the housing. In the event that the tool attached to the output arm should become jammed, there can be no damage to the saber saw or to the attachment. The two clutches 18 and 20 then slip, allowing the tongue 36 to continue to reciprocate; but there would be no motion in the arm drive. Thus, the device has a high degree of safety.

Although a specific embodiment of the present invention has been shown and described in detail above, it is to be expressly understood that the specific disclosure herein is solely for the purposes of compliance with the applicable patent laws regarding a disclosure of the best mode of the invention contained herein. It is to be expressly understood that the instant invention is limited only by the appended claims.

We claim:

1. A device of the character described comprising, a housing, a plurality of clips connected to said housing for releasably attaching the housing to a power tool, an arm drive mounted on said housing being adapted for connection to a reciprocating output of the power tool, said arm drive including a helical pinion drivingly connected to the reciprocating output of the power tool and a helical gear meshing with said helical pinion, the axis of rotation of the helical gear being skewed with respect to the axis of rotation of the helical pinion, and an output arm drivingly connected to the helical gear for reciprocation by the helical gear in a direction other than the direction of the reciprocating output of the power tool.

2. A device of the character described as defined in claim 1, including a clutch in driving connection with the reciprocating output of the power tool and the helical pinion, whereby overloading of the arm drive causes the clutch to slip, while the reciprocating output of the power tool continues to reciprocate.

3. A drive attachment adapted for mounting on a power tool comprising, a housing, a plurality of clips attached to said housing for releasably attaching the housing to the power tool, an input linkage mounted in said housing and being adapted for connection to a reciprocating output of the power tool, a clutch drivingly connected to the input linkage, an arm drive mounted in the housing and being drivingly connected to the clutch to be driven by the reciprocating output of the power tool through the input linkage and the clutch, said arm drive including a helical pinion drivingly connected to the clutch, a helical gear meshing with the helical pinion, the axis of rotation of the helical gear being skewed with respect to the axis of rotation of the helical pinion, and an output arm drivingly connected to the helical gear to be reciprocatingly driven by the reciprocating output of the power tool through the input linkage, the clutch, and the arm drive in a direction other than the direction of reciprocation of the reciprocating output, whereby an overload applied to the output arm prevents movement of the output arm and the clutch slips to allow the reciprocating output of the power tool to continue to operate.

4. A drive attachment adapted for mounting on a power tool as defined in claim 3 wherein the input linkage includes a connector link adapted for connection to the reciprocating output, and a throw arm having one end pivotedly connected to the connector link and the other end connected to the clutch.

5. A drive attachment adapted for mounting on a power tool as defined in claim 3 wherein the input linkage includes a connector link having one end drivingly connected to the reciprocating output of the power tool, a connector shaft pivotedly connected to the other end of the connector link, a pair of throw arms drivingly connected to opposite ends of the connector shaft, one of the throw arms being drivingly connected to the clutch, and the other of said throw arms being drivingly connected to a second clutch, said second clutch being drivingly connected to the helical pinion.

6. A drive attachment adapted for mounting on a power tool as defined in claim 3 wherein a connector rod has one end drivingly connected to the helical gear and the other end drivingly connected to the output arm.

7. A drive attachment adapted for mounting on a power tool as defined in claim 3 wherein the input linkage includes a connector link having one end drivingly connected to the reciprocating output of the power tool, a connector shaft pivotedly connected to the other end of the connector link, a pair of throw arms drivingly connected to opposite ends of the connector shaft, one of the throw arms being drivingly connected to the clutch, and the other of said throw arms being drivingly connected to a second clutch, said second clutch being drivingly connected to the arm drive; and said arm drive including a pinion shaft drivingly connected to said clutches and the helical pinion, and a connector rod having one end drivingly connected to the helical gear, the other end of said connector rod being drivingly connected to the output arm.

8. A drive attachment adapted for mounting on a power tool as defined in claim 3, including a chuck mounted on the free end of the output arm for holding a tool, said chuck being rotatably positionable on the output arm for selectively positoning the tool angularly relative to the length of the output arm.

9. A power tool attachment adapted for mounting on a saber saw comprising, a housing, means for releasably attaching said housing to a saber saw, a linkage adapted for connection to a reciprocating output of the saber saw, a helical pinion drivingly connected to the linkage, a helical gear meshing with the helical pinion, the axis of rotation of said helical gear being skewed with respect to the axis of rotation of said helical pinion, and an output arm connected to the helical gear to be reciprocated thereby in a direction other than the direction of reciprocation of the reciprocating output of the saber saw.

10. A drive attachment adapted for mounting on a power tool comprising; a housing having a substantially flat floor, a pair of side walls connected to the floor, and a top connected to the side walls; a plurality of clips connected to said housing for releasably connecting the housing to a power tool; a connector link movably mounted in the housing and having one end adapted for connection to a reciprocating output of the power tool, a connector shaft pivotedly connected to the connector link; a pair of throw arms pivotedly connected to opposite ends of the connector shaft; a clutch drivingly connected to each of the throw arms; a pinion shaft having opposite ends drivingly connected to the clutches; a helical pinion drivingly connected to the pinion shaft; a helical gear drivingly connected to the helical pinion, the axis of rotation of the helical gear being skewed with respect to the axis of rotation of the helical pinion; a connector rod having one end drivingly connected to the helical gear; and an output arm reciprocally mounted in the housing and being drivingly connected to the other end of the connector rod to be reciprocally driven thereby in a direction other than the direction of movement of the reciprocating output of the power tool; whereby an overload applied to the arm causes the clutches to slip, stopping movement of the arm and allowing the reciprocating output of the power tool to continue to drive the connector link, while the output arm is stopped.

11. A drive attachment adapted for mounting on a power tool as defined in claim 10, including a chuck mounted on the free end of the output arm for holding a tool, said chuck being rotatably positionable on the output arm for selectively positioning the tool angularly relative to the length of the output arm.

* * * * *